June 8, 1926.  
J. A. ROCHÉ  
1,588,268  
FUSELAGE CONSTRUCTION  
Filed April 30, 1923  3 Sheets-Sheet 2

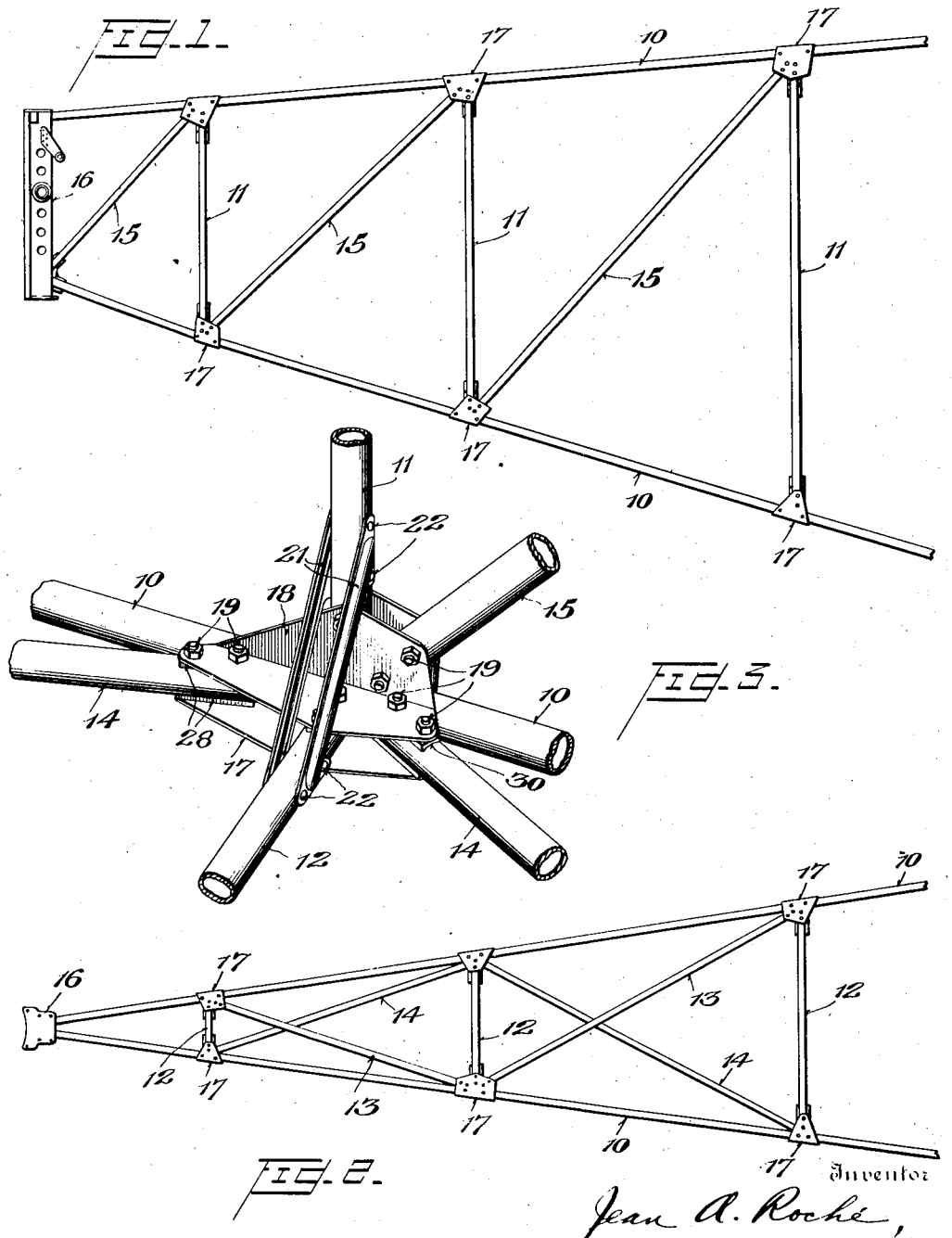

Inventor  
Jean A. Roché,  
By Robert H. Young  
Attorney

June 8, 1926.
J. A. ROCHÉ
1,588,268
FUSELAGE CONSTRUCTION
Filed April 30, 1923   3 Sheets-Sheet 3
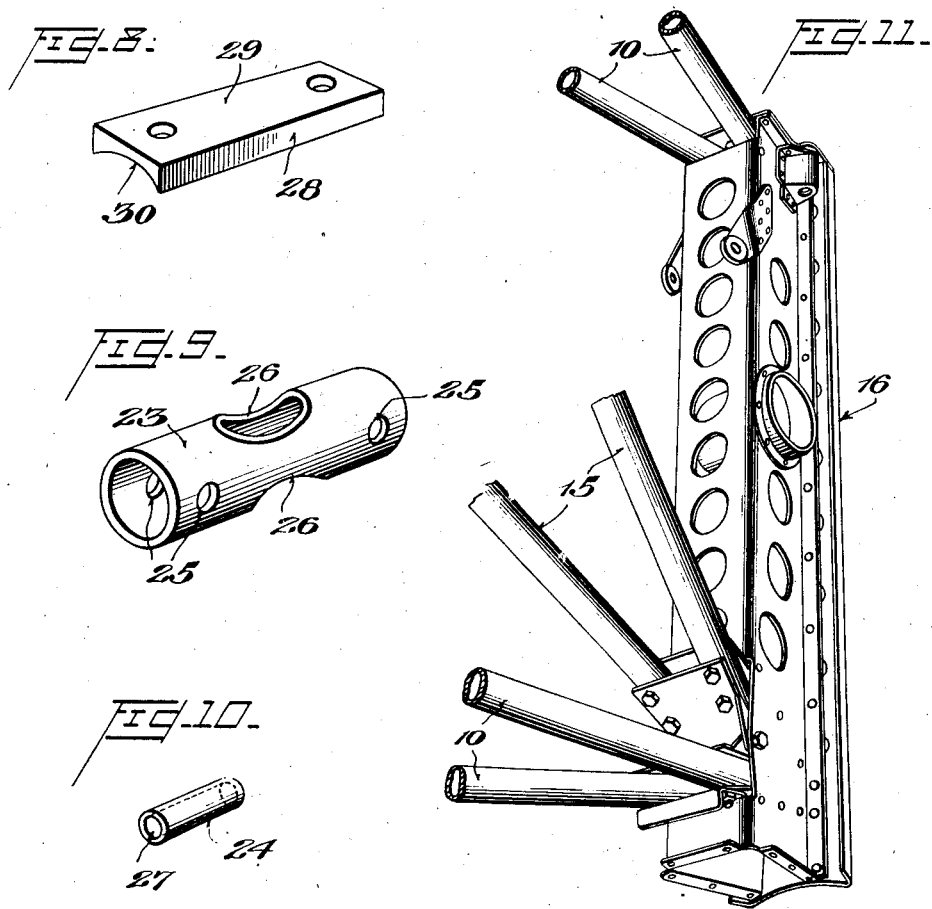

Patented June 8, 1926.

1,588,268

UNITED STATES PATENT OFFICE.

JEAN A. ROCHÉ, OF DAYTON, OHIO.

FUSELAGE CONSTRUCTION.

Application filed April 30, 1923. Serial No. 635,577.

This invention relates to the frame structure of aircraft and is shown as applied to the fuselage of an airplane.

The main object in view is to produce a strong, lightweight frame structure employing in conjunction with the frame members (ordinarily consisting of tubing) joint forming elements which increase rather than impair the strength of the entire structure and render the frame members capable of taking equally well all tension and compression stresses.

With the above and other objects in view, the invention consists in the novel construction, combination and arrangement of parts herein fully described, illustrated and claimed.

In the accompanying drawings:—

Fig. 1 is a side elevation of an aircraft fuselage embodying the invention.

Fig. 2 is a top plan of the same.

Fig. 3 is a detail perspective view of one of the joints, taken from the inside of the fuselage.

Figure 4:
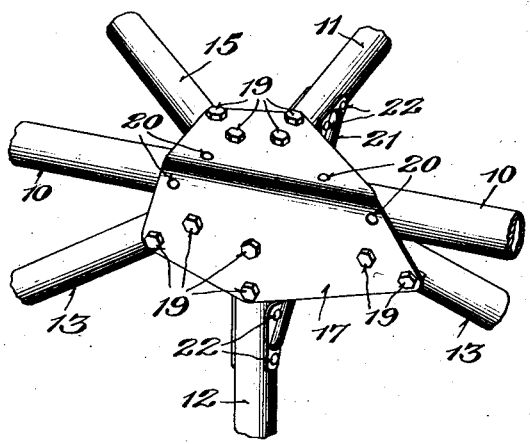
Fig. 4 is a similar view taken from the outside of the fuselage.
Figure 5:
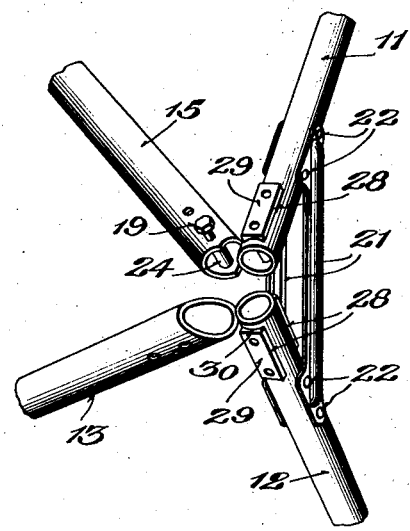
Fig. 5 is a perspective view of one of the joints, omitting the longéron and gussets.
Figure 6:
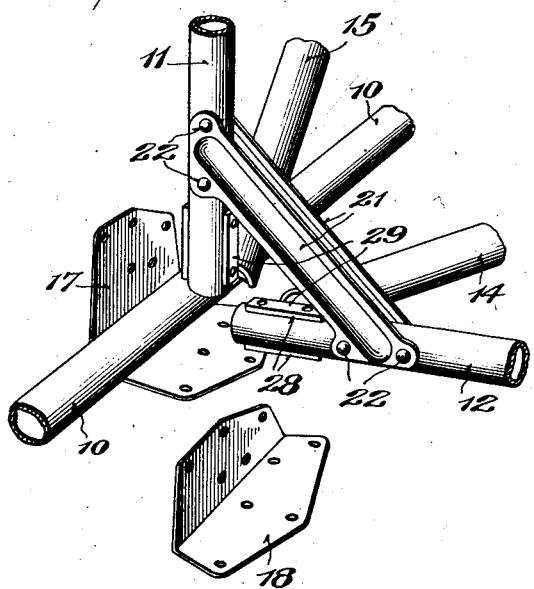
Fig. 6 is a perspective view of the same joint with parts separated.

Figs. 8, 9, and 10 are detail perspective views of the reinforcements used at the jointed extremities of the tubular frame members.

Fig. 11 is a detail view of the tail post.

In the drawings, the longérons 10 of the frame structure of the fuselage are connected together by vertical side struts 11 and horizontal top and bottom struts 12. Diagonal top and bottom braces 13 and 14 respectively, reversely inclined, are interposed between the upper longérons and the lower longérons in the manner shown in Fig. 2, while diagonal side braces 15 connect the upper longérons to the lower longérons. The rear extremities of the longérons are fastened to a sheet metal tail post 16. To obtain light-weight combined with the requisite strength and factor of safety the frame members 10, 11, 12, 13, 14, and 15 are tubular, preferably round in cross section.

A typical improved joint is well illustrated in Figs. 3 and 4 where the extremities of the struts 11 and 12 and the braces 14 and 15 are brought into juxtaposition to one of the longérons 10. All of said frame members are securely and rigidly fastened together by outer and inner gusset plates 17 and 18 respectively, two pins 19 (shown as bolts) inserted through each included frame member end position, and two or more pins 20 (shown as rivets). The pins 19 pass through the inner and outer gusset plates 17 and 18, while the pins 20 pass through the outer gusset plate 17 and the longéron 10.

To additionally strengthen the whole structure, corner braces 21 connect the side struts 11 to the top and bottom struts 12, each extremity of each brace 21 being expanded and fastened in place by two pins 22 (shown as rivets). Each of the corner braces 21 is shown as composed of two substantially parallel members or pieces which lie on opposite sides of the frame members to which they are fastened, as shown.

Figure 7:
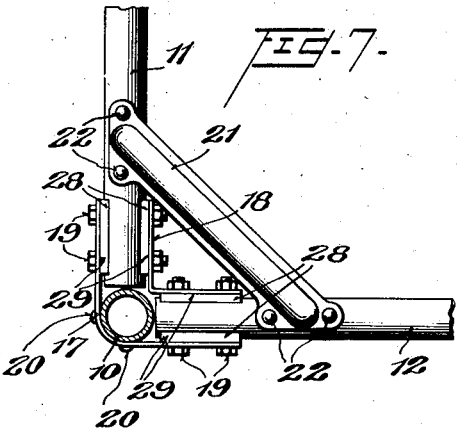
Fig. 7 is a similar view with the parts assembled.

To overcome crushing the extremities of the tubular frame members, they are reinforced by the inserts 23 and 24, shown in the detail views Figs. 9 and 10. Insert 23 consists of a short piece of tubing which is forced tightly into the end of a frame member, formed with holes 25 to receive the pins 19 and cut away at 26 to reduce weight. The end of the frame member is thus reinforced. The inserts 24 extend diametrically of the inside of the end of the frame member and the bores 27 thereof receive the pins 19. Face plates 28 each having a flat outer face 29 and a concaved inner face 30 are secured (as by soldering) to opposite sides of the frame member ends and provide flat parallel abutments against which the gusset plates 17 and 18 are seated. This is well shown in Fig. 7.

The tail post 16 is made up of sheet metal sections riveted or otherwise fastened rigidly together and has the rear extremities of the longérons 10 and the rearmost side braces 15 fastened fixedly thereto in the same manner as described in connection with the joint shown in Figs. 3 and 4 for example.

The joints are designed in accordance with the following:

A condition of fixity is imposed on all adjoining members. This implies the use of at least two bolts or rivets on the end of each member. It happens that a fixing moment equal to the strength of any member can be obtained by taking the bolts as designed for the tension or compression condition and spacing them a certain amount.

Perfect intersection of axis is arranged to avoid eccentricity moments, and members are fastened symmetrically to fittings whenever possible.

No adjustments are supplied for the members.

No operation other than bolting, riveting, and soldering is involved.

Bulkheads are built as separate units with gusset plates riveted to tube members.

Joint fitting plates are riveted to longérons and bolted to struts and bulkheads.

The size and number of bolts on struts, bulkheads and gussets are selected to develop the full strength of tube and to apply the required fixing moment.

The number of rivets in longérons is such as to meet the stress tending to move bulkhead along longéron and to apply the required fixing moment to the adjoining members.

Gage of gusset and gage of reinforcements are chosen to give bearing equal to the strength of tube. This may not develop full strength of bolt or rivet.

Sufficient clearances and tolerances are used to insure rapid assembly of the structure.

Bolt lengths are made so that no portion of the thread is used in bearing or shear. A spacer washer is used under each unit to cover the imperfect thread.

I claim:

1. In a frame structure, tubular frame members, gusset plates arranged on opposite sides of adjacent portions of said tubular frame members, a plurality of fastening members passing through said frame members and said gusset plates and reinforcing means in the frame members in the region of said fastening members to resist crushing strains.

2. In a frame structure, tubular frame members, gusset plates arranged on opposite sides of adjacent portions of said tubular frame members, a plurality of fastening members passing through said frame members and said gusset plates, and reinforcing sections in said frame members in the region of said fastening members to resist crushing strains.

3. In a frame structure, tubular frame members set at an angle to each other, gusset plates of sheet metal arranged on opposite sides of the adjacent portions of said frame members, and a plurality of fastening pins inserted through each frame member and said gusset plates, the frame members being reinforced in the region of said pins to resist crushing strains.

4. In a frame structure, tubular frame members set at an angle to each other, gusset plates of sheet metal arranged on opposite sides of the adjacent portions of said frame members, substantially parallel corner braces fastened at each end to one of the frame members by a plurality of pins, and a plurality of fastening pins inserted through each frame member and said gusset plates.

In testimony whereof I affix my signature.

JEAN A. ROCHÉ.